(12) United States Patent
Morita

(10) Patent No.: US 7,578,763 B2
(45) Date of Patent: Aug. 25, 2009

(54) DRIVE SHAFT REDUCTION GEAR

(75) Inventor: Mitsuaki Morita, Osaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 32 days.

(21) Appl. No.: 11/126,678

(22) Filed: May 11, 2005

(65) Prior Publication Data
US 2005/0255961 A1 Nov. 17, 2005

(30) Foreign Application Priority Data
May 17, 2004 (JP) .............................. 2004-145737

(51) Int. Cl.
*F16H 57/08* (2006.01)
(52) U.S. Cl. .................. 475/331; 180/369; 180/372
(58) Field of Classification Search ............. 180/369, 180/372, 374, 375, 378, 379; 475/331
See application file for complete search history.

(56) References Cited

U.S. PATENT DOCUMENTS

| 2,543,811 | A | * | 3/1951 | Snow et al. | 475/346 |
| 3,043,155 | A | * | 7/1962 | Salna | 74/391 |
| 4,158,972 | A | * | 6/1979 | Chamberlain | 475/337 |
| 6,652,405 | B2 | * | 11/2003 | Staheli et al. | 475/138 |

* cited by examiner

*Primary Examiner*—Ha D. Ho
(74) *Attorney, Agent, or Firm*—Fish & Richardson P.C.

(57) ABSTRACT

A drive shaft reduction gear using a planetary gear mechanism and having a high durability, wherein a rotation of a drive shaft is transmitted to a wheel hub via the planetary gear mechanism, a ring gear hub provided in a first ring gear in the planetary gear mechanism is hooked to a bearing holder attached to an axle housing via a split ring, thereby a movement in an axial direction of the first ring gear is regulated, and further, a shaft portion provided in the ring gear hub is non-rotatably supported by an inner peripheral surface of a shaft end portion of the axle housing.

5 Claims, 6 Drawing Sheets

DRIVE SHAFT REDUCTION GEAR

BACKGROUND OF THE INVENTION

1. Technical Field of the Invention

This invention relates to a drive shaft reduction gear, which transmits a rotation of a drive shaft to a driven body via a planetary gear mechanism.

2. Description of the Related Art

As a drive shaft reduction gear provided with a planetary gear mechanism which has been conventionally used, there has been proposed a structure of an independent suspension axle described in Japanese Patent Application Laid-Open No. 8-40095 or the like. The structure of the independent suspension axle described in the publication of the patent application mentioned above has a cross sectional structure shown in FIG. 6.

As shown in FIG. 6, in an axle housing 41 independently suspended by a vehicle body frame (not shown), a drive shaft 43, in which one end of the drive shaft is coupled to a universal joint 42, is supported at two points by a roller bearing 44 and a cylinder bush 45.

A sun gear shaft 47 having a sun gear 46 is fixed to an end portion of the drive shaft 43. A planetary gear 50 is engaged with the sun gear 46. The planetary gear 50 is pivoted to a planetary gear shaft 52 borne to a carrier 51. The planetary gear 50 is engaged with a ring gear 53 firmly fixed to the axle housing 41.

A ring gear hub 53a extending in a radial direction is attached to the ring gear 53. A shaft portion 53b extending in an axial direction is formed in the ring gear hub 53a. The shaft portion 53b is firmly fixed to an outer periphery of the axle housing 41 in accordance with a spline connection. The carrier 51 is connected to a wheel hub 54 rotatably attached to the axle housing 41.

The shaft portion 53b of the ring gear 53 is connected by spline to an outer peripheral portion of a shaft portion of the axle housing 41, and is non-rotatably attached to the axle housing 41. A movement regulation of the ring gear 53 in an axial direction is achieved by a locking piece 56 attached to an end portion of the axle housing 41. One bearing 55b bearing the wheel hub 54 is arranged in an outer peripheral portion of the shaft portion 53b of the ring gear 53.

The wheel hub 54 is borne by a pair of bearings 55a and 55b arranged in an outer peripheral portion of the axle housing 41 and an outer peripheral portion of the shaft portion 53b, respectively. A tire wheel (not shown) can be attached to the wheel hub 54. A rotation of the drive shaft 43 is reduced in speed by the planetary gear mechanism so as to be transmitted as a rotation of the wheel hub 54, and can rotate the tire wheel attached to the wheel hub 54 at a reduced speed.

The drive shaft 43 is supported at two points by the roller bearing 44 and the cylinder bush 45. Accordingly, even if a force in a radial direction is applied to the universal joint 42, the sun gear shaft 47 is not affected. Further, the sun gear shaft 47 is engaged by spline with the drive shaft 43 via a cylindrical joint 48. Therefore, the sun gear 46 is arranged in a floating state, and a tooth contact with the planetary gear 50 is kept good.

However, in the independent suspension axle structure described in Japanese Patent Application Laid-Open No. 8-40095, the bearing 55b is arranged in an outer peripheral portion of the shaft portion 53b. Accordingly, the structure is made such that the bearing 55b bearing the wheel hub 54 and the shaft portion 53b of the ring gear 53 are arranged between the axle housing 41 and the wheel hub 54. When the bearing 55b is exposed to a load applied from the wheel hub 54 so as to be deformed, a deformation load is applied also to the spline connection portion between the shaft portion 53b and the axle housing 41.

When the deformation load is applied to the spline connection portion between the shaft portion 53b and the axle housing 41, a micro slip due to a relative repeat is generated between two surfaces which are in contact with each other in the spline connection portion. An abrasion is generated between the two surfaces mentioned above due to the micro slip. In other words, a phenomenon that the abrasion is generated due to the micro slip, that is, a so-called fretting tends to be generated. Accordingly, there is a problem that durability is lowered in the spline portion due to the generation of the fretting.

Further, the wheel hub 54 is borne to the outer peripheral portion of the shaft portion 53b in the ring gear 53 via the bearing 55b. Accordingly, there is a problem that an outer peripheral diameter of the wheel hub 54 becomes large. Further, the structure is made such that the locking piece 56 achieving the movement regulation of the ring gear 53 in the axial direction is arranged in a space portion between the end portion of the axle housing 41 and the sun gear 46. Accordingly, it is impossible to make a thickness of the locking piece 56 sufficiently thick, and it is hard to sufficiently secure strength of the locking piece 56.

SUMMARY OF THE INVENTION

This invention is made by taking the problem mentioned above into consideration, and a first aspect of the present invention relates to a drive shaft reduction gear transmitting a rotation of a drive shaft arranged so as to pass through an inner side of a drive shaft housing to a driven body supported by the drive shaft housing via a bearing, via a planetary gear mechanism. Further, in the drive shaft reduction gear, a shaft portion of a ring gear constituting the planetary gear mechanism is non-rotatably supported by an inner peripheral surface of a shaft portion of the drive shaft housing. A bearing holder holding the bearing in an axial direction is attached to the drive shaft housing. A movement of the ring gear in the axial direction is regulated by locking means with respect to the bearing holder.

According to the first aspect of the invention, it is possible to arrange the bearing supporting the driven body in the drive shaft housing. Further, the shaft portion of the ring gear is non-rotatably supported by an inner peripheral surface side of the drive shaft housing without supporting the bearing. Accordingly, even if the bearing is exposed to the load from the driven body, the load can be directly supported by the drive shaft housing.

Accordingly, it is possible to prevent a deformation load from being applied between the shaft portion of the ring gear and the inner peripheral surface side of the drive shaft housing on the basis of the load applied from the driven body. In other words, it is possible to prevent the fretting from being generated between the shaft portion of the ring gear and the inner peripheral surface side of the drive shaft housing. Accordingly, it is possible to improve durability in the connection portion between the shaft portion of the ring gear and the inner peripheral surface side of the drive shaft housing.

Further, the shaft portion of the ring gear is supported by the inner peripheral surface of the shaft portion of the drive shaft housing. Accordingly, it is possible to assemble the ring gear hub in the drive shaft housing after assembling the bearing supporting the driven body in the drive shaft housing. Therefore, an assembling work can be easily executed, and it is possible to detach the ring gear hub from the drive shaft housing without detaching the bearing. Accordingly, it is possible to easily disassemble at the time of repairing, inspecting or the like.

Further, the structure is made such that the rotating force of the ring gear is not transmitted to the bearing holder holding the bearing in the axial direction. Accordingly, the bearing holder is not loosened by the rotating force of the ring gear. Further, since the ring gear hub is supported by the inner peripheral surface of the drive shaft housing, it is possible to reduce an outside dimension in a radial direction and a length in an axial direction of the drive shaft reduction gear. In accordance with these matters, it is possible to achieve a compact structure of the drive shaft reduction gear.

According to second and third aspects of the invention, a split ring can be employed as the locking means. Thus, a split piece of the split ring can be sequentially engaged with the bearing holder after the bearing holder is attached to the drive shaft housing. Accordingly, it is possible to easily assemble the split ring. Further, according to the third aspect, it is possible to easily execute an engaging work between the split ring and the bearing holder.

According to fourth and fifth aspects of the present invention, the structure can be made such that the movement of the ring gear hub in the axial direction by the locking means is directly regulated by the bearing holder, or is regulated by interposing a stopper member between the ring gear hub and the bearing holder.

DESCRIPTION OF THE PREFERRED EMBODIMENTS

Figure 1:
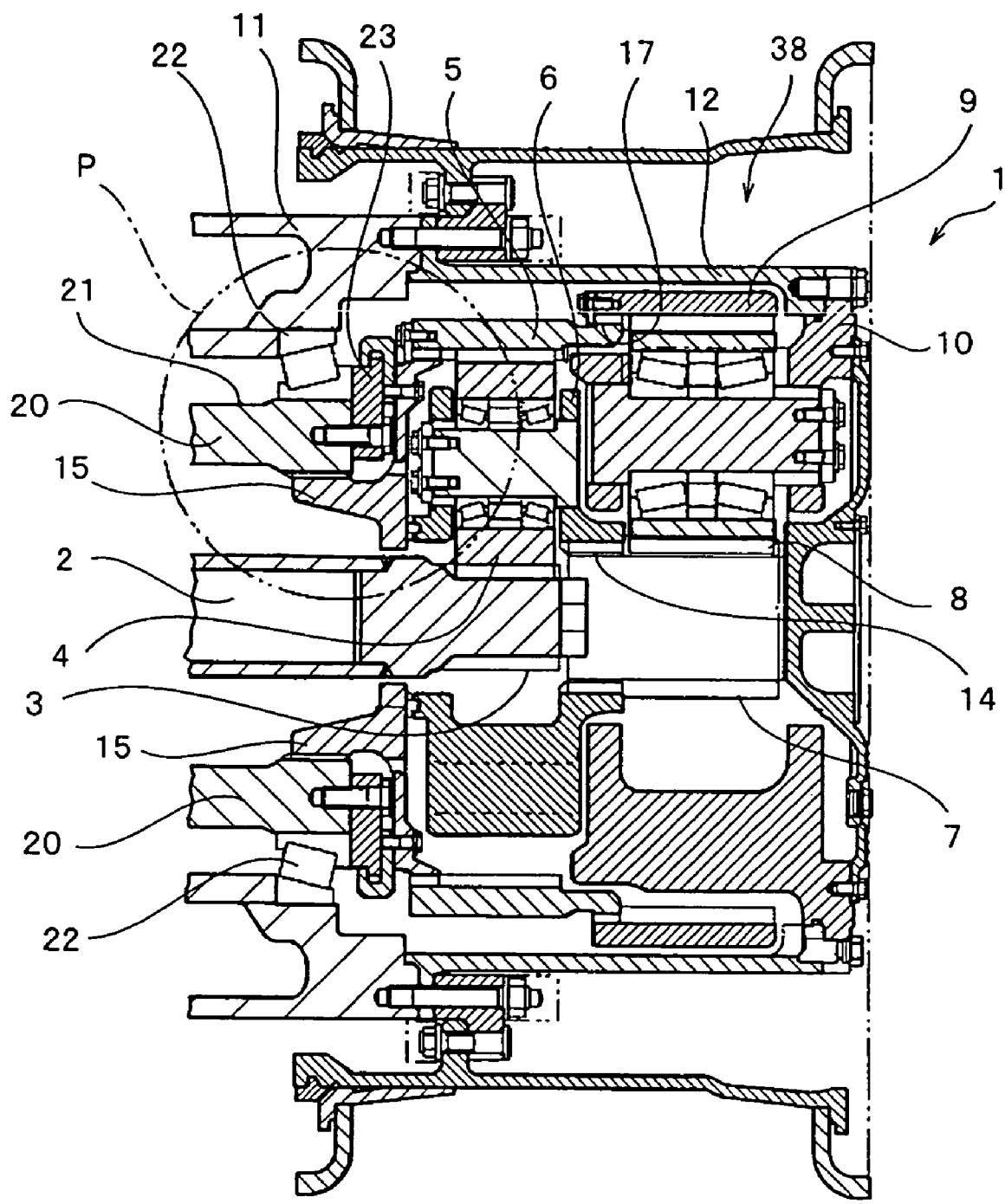
FIG. 1 is a cross sectional view showing a structure of a drive shaft reduction gear according to the invention.

A drive shaft reduction gear according to this invention can be well applied to an independent suspension axle apparatus as shown in FIG. 1, a transmission apparatus or the like. In the independent suspension axle apparatus, an axle housing is used as a drive shaft housing, and a wheel hub is used as a driven body. The structure of the drive shaft reduction gear according to the invention is not limited to the structure described below, but can be variously modified.

First Embodiment

As shown in FIG. 1, a drive shaft reduction gear 1 is provided with a two-stage reduction planetary gear apparatus. The drive shaft reduction gear 1 can be structured such as to be provided with a single-stage reduction planetary gear apparatus or a multi-stage reduction planetary gear.

A drive shaft 2 branched by a differential gear or the like is arranged within an axle housing 20 corresponding to the drive shaft housing. A two-speed planetary gear apparatus 38 is arranged between the drive shaft 2 and a wheel hub 11.

The planetary gear apparatus 38 executes a first stage shift by a first sun gear 3 provided in a leading end of the drive shaft 2, a first ring gear 5 non-rotatably supported by a spline connection portion 16 with respect to the axle housing 20, and a first planetary gear 4 arranged between the first sun gear 3 and the first ring gear 5. A rotation of a first carrier 6 bearing the first planetary gear 4 is transmitted to a second sun gear 7 arranged in a front side of the driven shaft 2.

Further, the planetary gear apparatus 38 executes a second stage shift by the second sun gear 7, a second ring gear 9 non-rotatably supported by the first ring gear 5 and a spline connection portion 17, a second planetary gear 8 arranged between the second sun gear 7 and the second ring gear 9, and a second carrier 10 bearing the second planetary gear 8 and connected to the wheel hub 11. The second carrier 10 is integrally connected to the wheel hub 11 via a ring 12.

The two-speed planetary gear mechanism is exemplified as the planetary gear mechanism 38, however, the planetary gear mechanism can employ a multi stage shift planetary gear mechanism and a single stage shift planetary gear mechanism.

The wheel hub 11 is rotatably supported by a pair of bearings 22 arranged between the wheel hub and the axle housing 20. Further, a tire wheel is attached to an outer peripheral portion of the wheel hub 11. In this case, only one bearing 22 is shown in FIG. 1, and the other bearing is not illustrated.

The rotation of the drive shaft 2 is transmitted to the planetary gear apparatus 38 from the first sun gear 3. The first ring gear 5 is non-rotatably fixed by the axle housing 20. Accordingly, the first planetary gear 4 rotates on its own axis and revolves around the first sun gear 3 on the basis of the rotation of the first sun gear 3. The first carrier 6 rotates in a state in which the rotation of the drive shaft 2 is reduced, on the basis of the revolution of the first planetary gear 4.

The second sun gear 7 rotates on the basis of the rotation of the first carrier 6. The second ring gear 9 is fixed to the first ring gear 5 non-rotatably fixed by the axle housing 20. Accordingly, the second planetary gear 8 executes the autorotation and the revolution on the basis of the rotation of the second sun gear 7. The second carrier 10 rotates in a state in which the rotation of the second sun gear 7 is further reduced, on the basis of the revolution of the second planetary gear 8.

The rotation of the second carrier 10 is transmitted to the wheel hub 11 via the ring 12, and the wheel hub 11 rotates in a state in which the rotation of the drive shaft 2 is reduced at two stages. It is possible to rotate the tire wheel on the basis of the rotation of the wheel hub 11. Accordingly, traveling of a vehicle is achieved.

Figure 2:
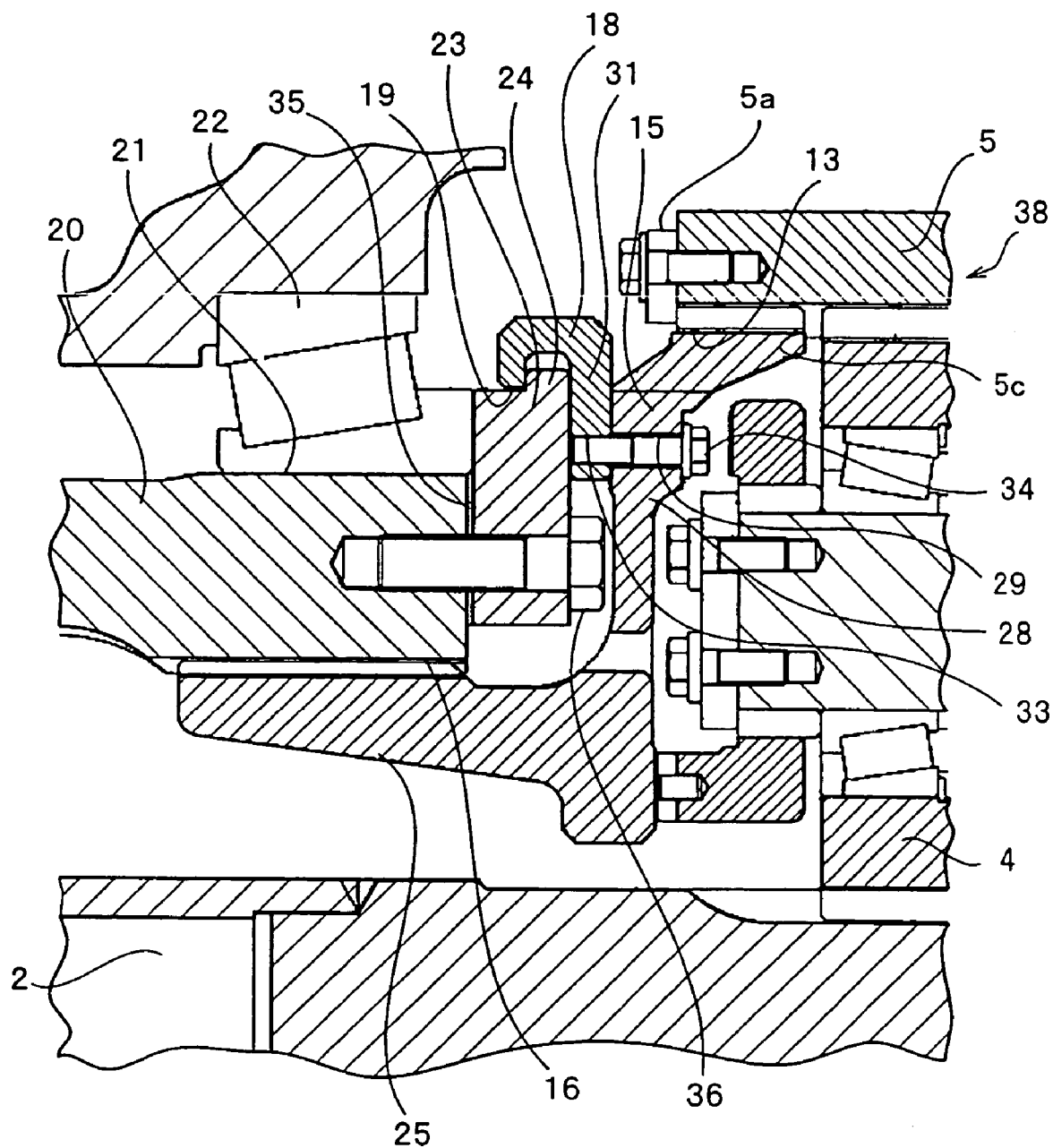
FIG. 2 is an enlarged view of a main portion of a portion P in FIG. 1.

As shown in FIG. 2 showing an enlarged view of a main portion of a portion surrounded by a portion P in FIG. 1, the first ring gear 5 and the ring gear hub 15 are connected by spline in a spline connection portion 13. A portion between an inner peripheral surface of an end portion of the first ring gear 5 and an outer peripheral surface of the ring gear hub 15 is connected by spline by a spline connection portion 16. The ring gear hub 15 is non-rotatably supported by the axle housing 20 on the basis of the spline connection.

A shaft portion of the first ring gear 5 is structured such as to be supported by an inner peripheral surface of a shaft end portion 21 of the axle housing 20. Accordingly, it is possible to assemble the ring gear hub 15 in the axle housing 20 after assembling the bearing 22 supporting the wheel hub 11 in the axle housing 20. Therefore, an assembling work can be easily achieved, and it is possible to easily detach the ring gear hub 15 from the axle housing 20 without detaching the bearing 22.

Accordingly, it is possible to easily disassemble at the time of repairing, inspecting or the like.

In the description mentioned above, the description is given of the example in which the ring gear hub 15 and the first ring gear 5 are structured by the independent bodies. However, the ring gear hub 15 and the first ring gear 5 can be integrally structured.

A movement of the first ring gear 5 in the axial direction is regulated by a contact between a gear end surface 5c of the first ring gear 5 engaging with the first planetary gear 4 and the spline portion of the ring gear hub 15, and a contact between a holder ring 5a attached to the first rig gear 5 and the spline portion of the ring gear hub 15.

The bearing 22 bearing the wheel hub 11 is attached to an outer peripheral surface of the shaft end portion 21 of the axle housing 20. The bearing 22 is structured as a taper roller bearing. An inner race of the bearing 22 is fixed by a bearing holder 23 in such a manner as to be prevented from slipping out in the axial direction.

The bearing holder 23 is attached to the shaft end portion 21 of the axle housing 20 by a bolt 36 while holding a shim 35 there between. A pressurization to the bearing 22 can be adjusted on the basis of the number of the shims 35 arranged between the bearing holder 23 and the shaft end portion 21 of the axle housing 20.

Figure 3:
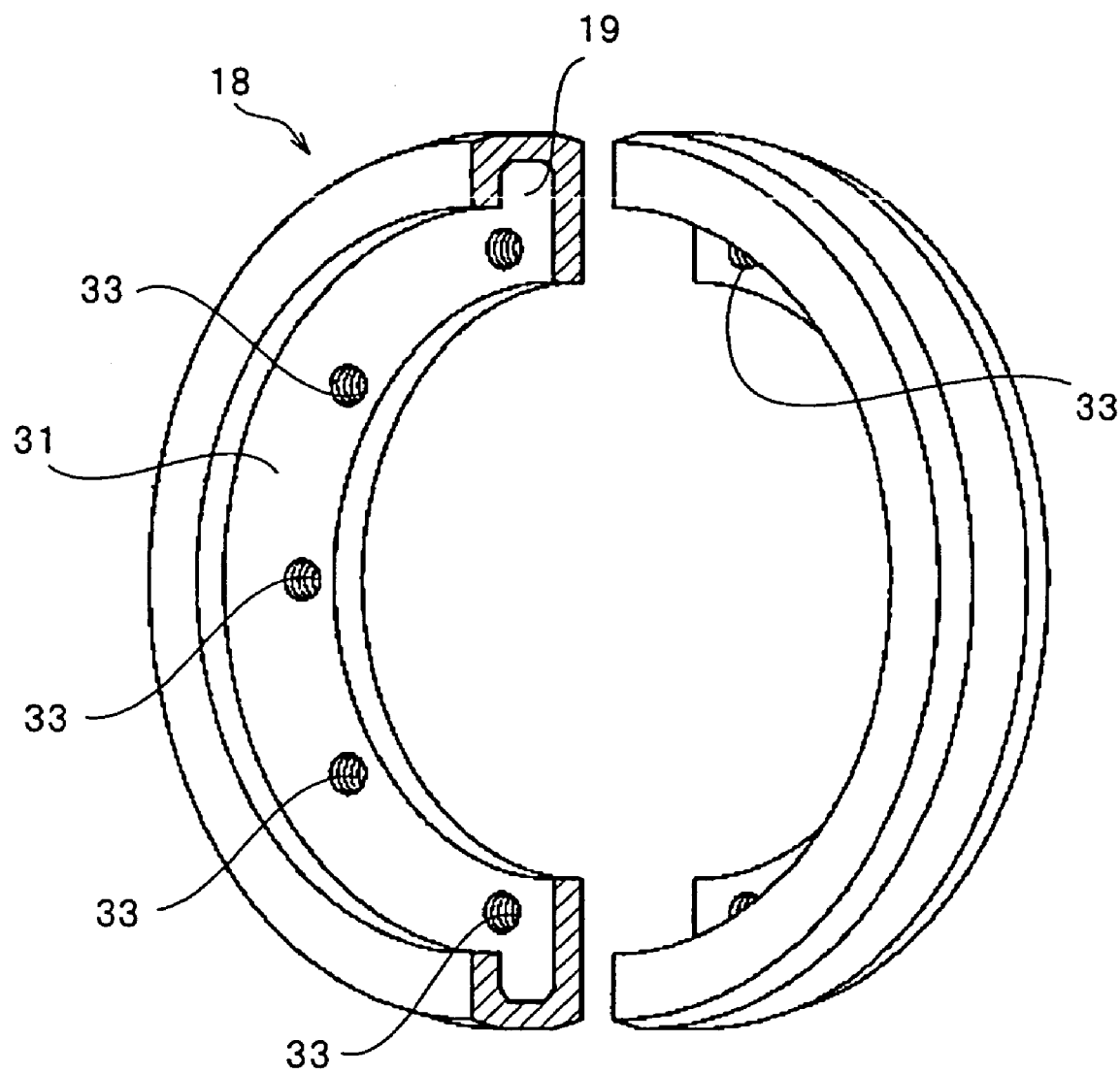
FIG. 3 is a perspective view showing a structure of a split ring according to the invention.

A step portion 24 is provided in an outer periphery of the bearing holder 23. A recess portion 19 of a split ring 18 can be hooked to the step portion 24. The split ring 18 is attached to the ring gear hub 15 by a bolt 34. As shown in FIG. 3, the inward recess portion 19 is formed in an outer periphery of the split ring 18. A leading end of the recess portion 19 is formed as a hook portion hooked to the step portion 24 of the bearing holder 23.

As shown in FIG. 2, the recess portion 19 of the split ring 18 can be hooked to the step portion 24 of the bearing holder 23. A locking means for executing a movement regulation of the ring gear hub 15 in the axial direction is structured by hooking the recess portion 19. The movement in the axial direction of the first ring gear 5 with respect to the axle housing 20 is regulated by the locking means.

In other words, it is possible to regulate the movement in the axial direction of the first ring gear 5 by the locking means with respect to the bearing holder 23. Accordingly, in comparison with the structure in which the movement in the axial direction of the ring gear is not regulated, it is possible to securely prevent the first ring gear 5 from being brought into contact with the end surface of the planetary gear, the end surface of the sun gear or the like.

In particular, if the structure is made such that the end surface of the sun gear is brought into contact with the end surface of the ring gear, thereby regulating the movement in the axial direction of the ring gear, all the load in the axial direction is received by the end surface of the sun gear, so that there is a risk that an early abrasion is generated. On the contrary, according to the invention, since the first ring gear 5 is not brought into contact with the end surface of the first sun gear 3, it is possible to prevent the risk of the early abrasion in the end surface of the first sun gear, and it is possible to improve a durability of the first sun gear 3.

As shown in FIG. 3, a plurality of screw holes 33 is provided in a flange portion 31 of the split ring 18. As shown in FIG. 2, the split ring 18 is attached to a flange portion 28 of the ring gear hub 15 by the bolt 34 inserted to a bolt hole 29 formed in the flange portion 28 of the ring gear hub 15.

As mentioned above, it is possible to sequentially engage a split piece of the split ring 18 with the bearing holder 23 after attaching the bearing holder 23 to the axle housing 20. Accordingly, it is possible to easily assemble the split ring 18.

In FIG. 3, the split ring 18 is shown as the ring which is divided into two pieces on its circumference, however, the split ring 18 may be structured as a ring which is divided into three pieces, four pieces or more pieces.

Accordingly, it is possible to non-rotatably support a shaft portion 25 of the first ring gear 5, that is, the shaft portion 25 of the ring gear hub 15 attached to the first ring gear 5 in an inner peripheral surface of the shaft end portion 21 of the axle housing 20. Further, it is possible to regulate the movement in the axial direction of the first ring gear 5, by the split ring 18 and the bearing holder 23.

Further, it is possible to support the bearing 22 bearing the wheel hub 11 by the shaft end portion 21 of the axle housing 20. Further, the movement regulation of the bearing 22 in the axial direction can be regulated by the bearing holder 23. It is possible to make the drive shaft reduction gear compact on the basis of the structure mentioned above.

Second Embodiment

Figure 4:
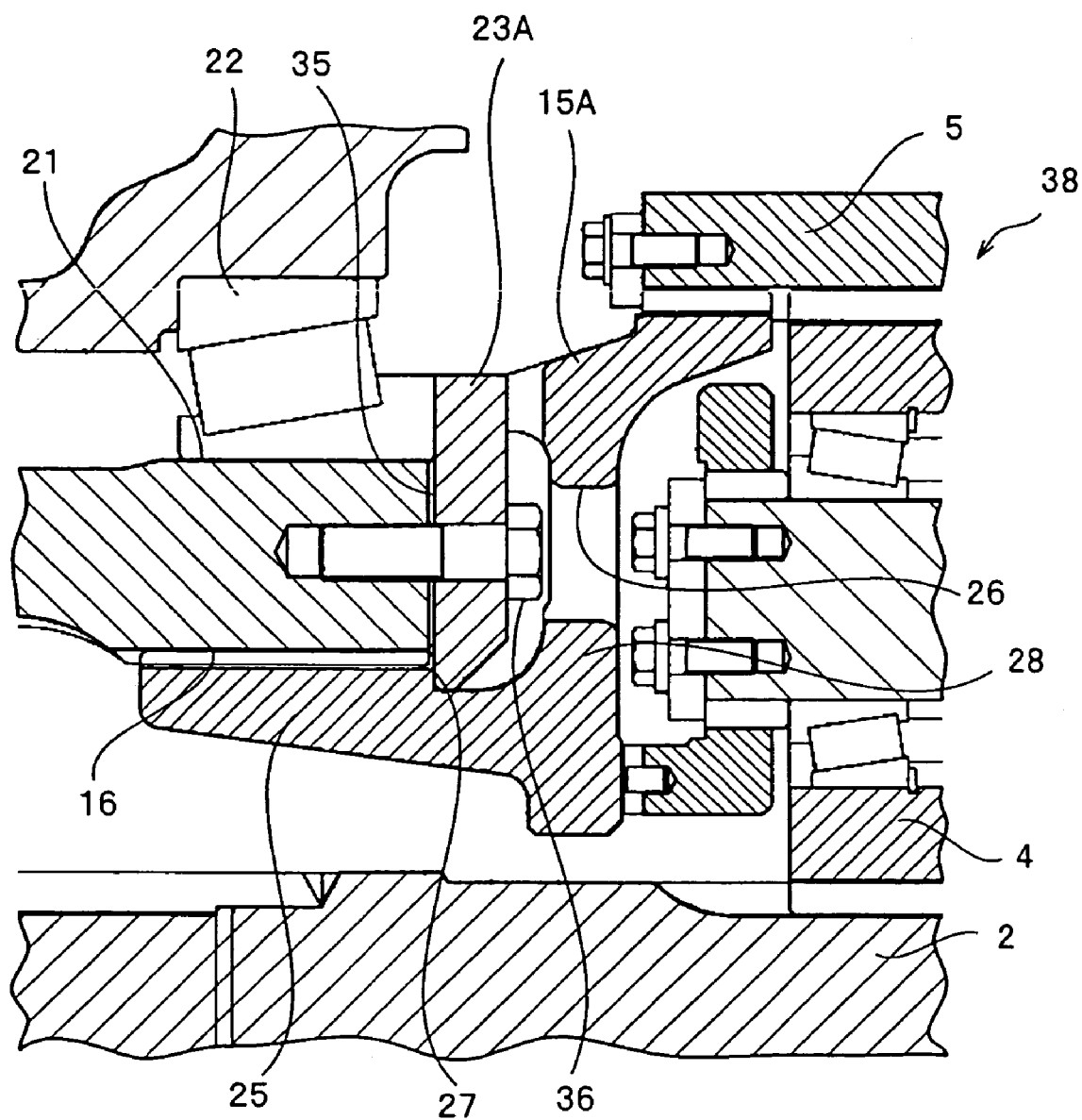
FIG. 4 is a cross sectional view showing a structure of another embodiment of the drive shaft reduction gear according to the invention.

FIG. 4 shows a structure of another embodiment of the drive shaft reduction gear according to the invention. In a second embodiment, the structure of the locking means is differentiated from the structure of the locking means according to the first embodiment. The other structures have the same structures as those of the first embodiment. A description of the same structures as those of the first embodiment will not be repeated, using the same reference numerals used in the first embodiment.

A step portion 27 is formed between a spline connection portion 16 with an axle housing 20 and a flange portion 28 of a ring gear hub 15A, in an outer peripheral portion of a shaft portion 25 of the ring gear hub 15A. An inner end surface of a bearing holder 23A can be brought into contact with the step portion 27 mentioned above. A locking means for regulating the movement in the axial direction of the ring gear hub 15A is structured by an inner end surface of the bearing holder 23A and the step portion 27 formed in the outer peripheral surface of the ring gear hub 15A.

Further, a bolt 36 attaching the bearing holder 23A to a shaft end portion 21 of the axle housing 20 can be fastened via a fastening hole 26 formed in the flange portion 28 of the ring gear hub 15A.

The bearing holder 23A is structured as a split type bearing holder divided in a peripheral direction, for the purpose of making an assembling work easy.

Third Embodiment

Figure 5:
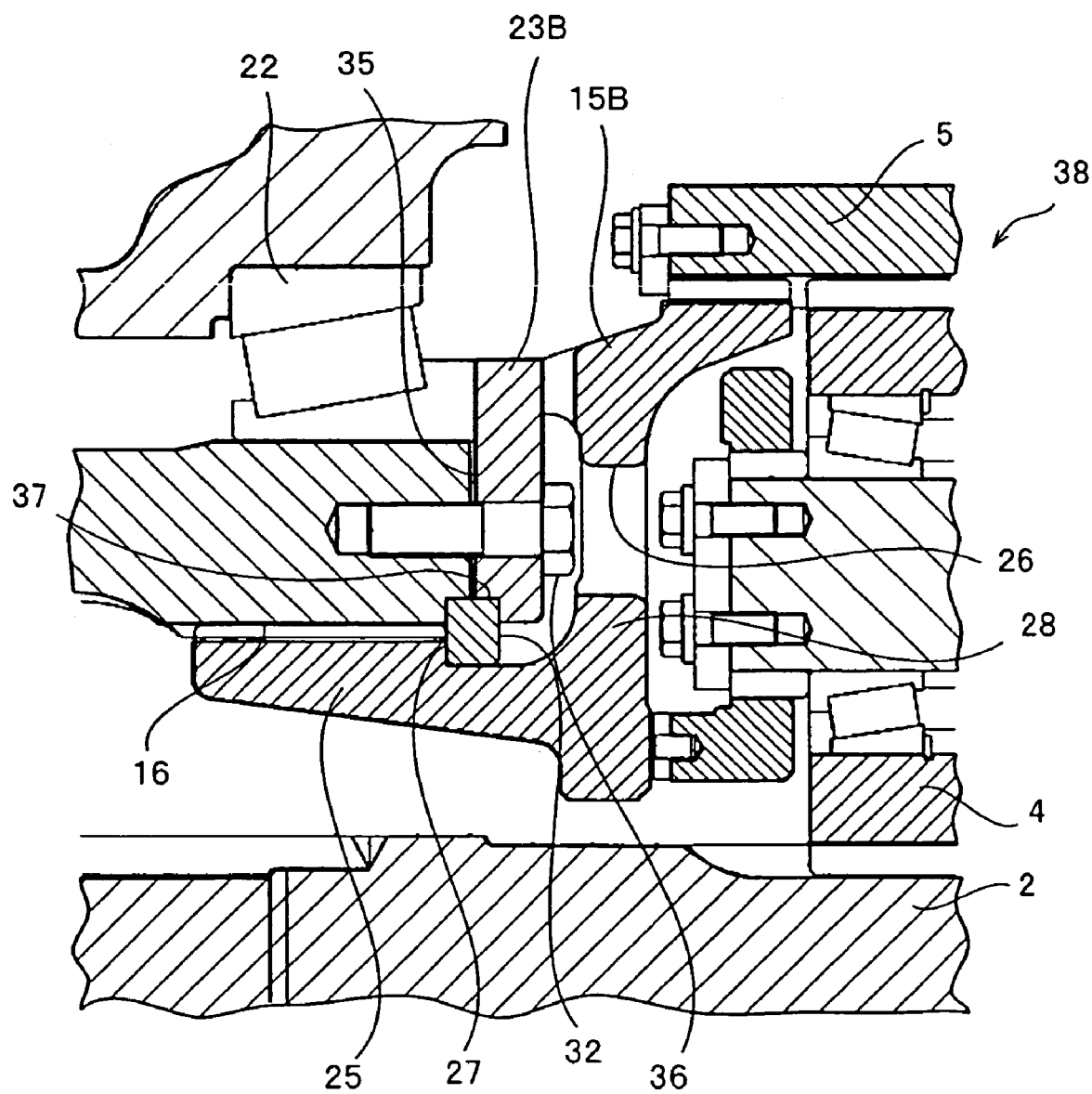
FIG. 5 is a cross sectional view showing a structure of still another embodiment of the drive shaft reduction gear according to the invention.
Figure 6:
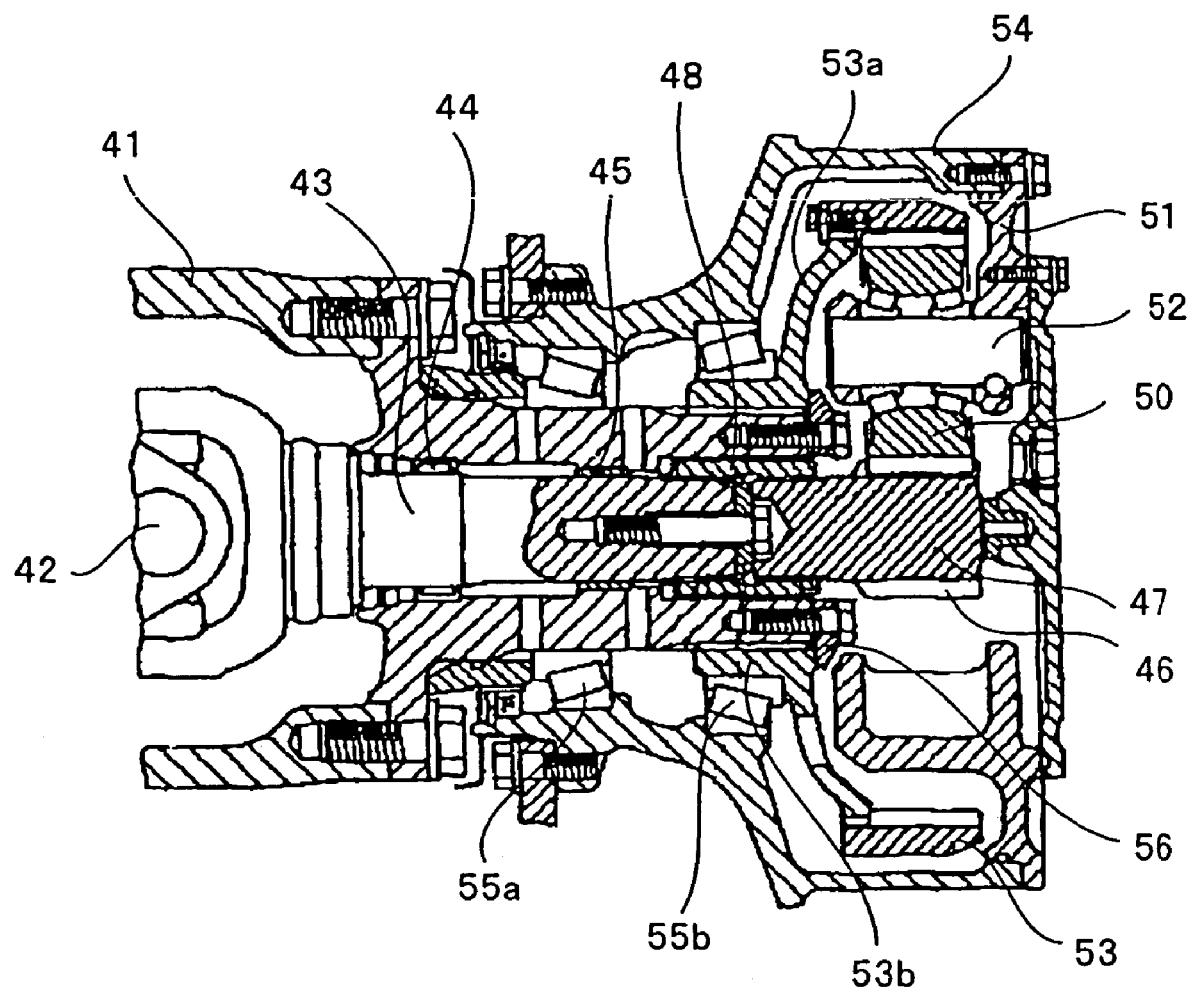
FIG. 6 is a cross sectional view showing a structure of a known drive shaft reduction gear.

FIG. 5 shows a structure of another embodiment of the drive shaft reduction gear according to the invention. In a third embodiment, a split type stopper member 32 for regulating a movement in an axial direction of a ring gear hub 15B is provided as a structure of the locking means. In this regard, the structure is different from the locking means in the second embodiment.

The other structures have the same structures as those of the second embodiment. A description of the same structures as those of the first and second embodiments will not be repeated, using the same reference numerals used in the first and second embodiments.

A step portion 27 is formed between an axle housing 20A and a flange portion 28 of the ring gear hub 15B, in the outer peripheral surface of a shaft portion 25 of the ring gear hub 15B. The step portion 27 is brought into contact with the split type stopper member 32 pinched between a bearing holder 23B and the end portion of the axle housing 20.

In order to fix the split type stopper member 32 between the axle housing 20 and the bearing holder 23B, a stepped groove 37 is formed in each of a shaft end portion 21 of the axle housing 20 and an end surface of the bearing holder 23B.

Further, a bolt 36 attaching a bearing holder 23A to the shaft end portion 21 of the axle housing 20 can be fastened via a fastening hole 26 formed in the flange portion 28 of the ring gear hub 15B.

The split type stopper member 32 is structured such as to be divided into two pieces in the same manner as the split ring 18, but may be structured such as to be divided into three pieces, four piece or more pieces.

The movement in the axial direction of a ring gear hub 15A with respect to the axle housing 20 is regulated by the split type stopper member 32 pinched between the axle housing 20 and the bearing holder 23B. The bearing holder 23A is structured as a split type bearing holder divided in a peripheral direction, in order to make an assembling work easy.

According to the drive shaft reduction gear of the present invention, the bearing 22 is directly supported by the shaft portion of the axle housing 20. Accordingly, even if the bearing 22 receives the load from the wheel hub 11, the load can be supported by the axle housing 20. Accordingly, the spline connection portion 16 between the ring gear hub 15 and the axle housing 20 does not receive the load from the wheel hub 11. In other words, the fretting is hard to be generated in the spine connection portion 16 between the ring gear hub 15 and the axle housing 20, and it is possible to improve a durability in the spline connection portion 16.

Further, a rotating force from the first ring gear 5 is not transmitted to the bearing holder 23 holding the bearing 22 in the axial direction. Accordingly, the bearing holder is not loosened by the rotating force of the first ring gear 5.

Further, the ring gear hub 15 is supported by the inner peripheral surface of the shaft portion of the axle housing 20. Accordingly, it is possible to make the length in the axial direction and the diameter in the radial direction in the drive shaft reduction gear short, and it is possible to make the drive shaft reduction gear compact.

Further, since the ring gear hub 15 is supported by the inner peripheral surface of the shaft portion in the axle housing 20, it is possible to assemble the ring gear hub 15 in the axle housing 20 after assembling the bearing 22 in the axle housing 20. Accordingly, the assembly is easily executed, and it is possible to shorten the working time required for the assembly. Further, it is possible to detach the ring gear hub 15 from the axle housing 20 without detaching the bearing 22, and it is easy to disassemble at the time of the repair, the inspection and the like.

What is claimed is:

1. A drive shaft reduction gear comprising:
    a driven body rotatably supported by a drive shaft housing via a bearing;
    a drive shaft passing through an inner side of the drive shaft housing and transmitting a rotation to the driven body; and
    a planetary gear mechanism arranged between the drive shaft and the driven body and reducing a rotation of the drive shaft so as to transmit the rotation to the driven body,
    wherein a sun gear in the planetary gear mechanism is supported by the drive shaft so as to be integrally rotatable, a carrier supporting a planetary gear in the planetary gear mechanism is supported by the driven body so as to be integrally rotatable, a ring gear in the planetary gear mechanism is non-rotatably supported by the drive shaft housing, and the ring gear has a ring gear hub extending in a radial direction from the ring gear and a shaft portion extending in an axial direction from the ring gear hub,
    wherein the shaft portion of the ring gear is non-rotatably supported by an inner peripheral surface of a shaft portion of the drive shaft housing, and
    wherein the drive shaft reduction gear further comprises:
    a bearing holder attached to the drive shaft housing and holding the bearing in an axial direction; and
    locking means for regulating a movement in the axial direction of the ring gear, the locking means being provided in the bearing holder.

2. The drive shaft reduction gear as claimed in claim 1, wherein the locking means is provided with a split ring which can be hooked to the bearing holder and is divided into a plurality of pieces in a circumferential direction, and fixing means for firmly fixing the ring gear hub to the split ring.

3. The drive shaft reduction gear as claimed in claim 2, wherein the split ring has a recess portion to be engaged with an end portion of the bearing holder.

4. The drive shaft reduction gear as claimed in claim 1, wherein the locking means is structured by an engagement of a step portion formed in an outer periphery of the shaft portion of the ring gear with an inner peripheral surface side end portion of the bearing holder.

5. The drive shaft reduction gear as claimed in claim 4, wherein a split type stopper member is interposed between the step portion and the inner peripheral surface side end portion of the bearing holder.

* * * * *

UNITED STATES PATENT AND TRADEMARK OFFICE
CERTIFICATE OF CORRECTION

| | | |
|---|---|---|
| PATENT NO. | : 7,578,763 B2 | Page 1 of 1 |
| APPLICATION NO. | : 11/126678 | |
| DATED | : August 25, 2009 | |
| INVENTOR(S) | : Morita | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 32 days.

Delete the phrase "by 32 days" and insert -- by 256 days --

Signed and Sealed this

Twenty-seventh Day of April, 2010

David J. Kappos
*Director of the United States Patent and Trademark Office*